(12) United States Patent
Griffiths (10) Patent No.: US 7,729,287 B2
(45) Date of Patent: Jun. 1, 2010

(54) METHODS OF PROVIDING SIMULATION FOR COMMUNICATIONS SYSTEMS AND RELATED SYSTEMS AND COMPUTER PROGRAM PRODUCTS

(75) Inventor: Michael Griffiths, Duluth, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 412 days.

(21) Appl. No.: 11/595,173

(22) Filed: Nov. 10, 2006

(65) Prior Publication Data

US 2008/0112328 A1 May 15, 2008

(51) Int. Cl.
H04L 12/26 (2006.01)
H04L 12/56 (2006.01)
G06F 15/177 (2006.01)
G06F 15/173 (2006.01)

(52) U.S. Cl. .................. 370/254; 370/409; 709/220; 709/223

(58) Field of Classification Search .................. 370/241, 370/254, 409; 709/220, 223
See application file for complete search history.

(56) References Cited

U.S. PATENT DOCUMENTS

| | | |
|---|---|---|
| 2002/0004828 A1 | 1/2002 | Davis et al. |
| 2002/0180779 A1 | 12/2002 | Dzickan, Jr. et al. |
| 2003/0084129 A1 | 5/2003 | Nakamura et al. |
| 2003/0101251 A1 | 5/2003 | Low |
| 2003/0108177 A1 | 6/2003 | Hsich et al. |
| 2003/0131054 A1 | 7/2003 | Sohn |
| 2003/0133556 A1 | 7/2003 | Naik et al. |
| 2003/0137934 A1 | 7/2003 | Schaller et al. |
| 2003/0172141 A1 | 9/2003 | Miller, II et al. |
| 2003/0202645 A1 | 10/2003 | Naik et al. |
| 2004/0022027 A1 | 2/2004 | Weber et al. |
| 2004/0032947 A1 | 2/2004 | Nattkemper |
| 2004/0081308 A1 | 4/2004 | Naik et al. |
| 2004/0098422 A1 | 5/2004 | Levesque et al. |
| 2004/0107277 A1 | 6/2004 | Levesque et al. |
| 2004/0151205 A1 | 8/2004 | Kang |

(Continued)

OTHER PUBLICATIONS

"Element Management Systems (EMSs)" *1. Position of the EMS in the Telecommunication Network Architecture*; International Engineering Consortium (IEC: Element Management Systems (EMSs)) pp. 1-2.

(Continued)

*Primary Examiner*—Alpus H Hsu
*Assistant Examiner*—Saad Hassan
(74) *Attorney, Agent, or Firm*—Myers Bigel Sibley & Sajovec, P.A.

(57) ABSTRACT

A method of simulating a telecommunications network may include providing a database including status information for a plurality of virtual network elements. More particularly, the status information for each of the plurality of virtual network elements may include a respective network element identifier. A communication including a received network element identifier may be received. If the received network element identifier does not correspond to a network element identifier included in the database, status information for a new virtual network element may be added to the database and the status information for the new virtual network element may include the received network element identifier. After adding the status information for the new virtual network element, a communication regarding the new virtual network element may be transmitted. Related systems and computer program products are also discussed.

16 Claims, 4 Drawing Sheets

U.S. PATENT DOCUMENTS

| | | | |
|---|---|---|---|
| 2005/0010659 A1 | 1/2005 | Gonguet et al. | |
| 2005/0125457 A1 | 6/2005 | Kang | |
| 2005/0125492 A1 | 6/2005 | Yu et al. | |
| 2005/0171993 A1 | 8/2005 | Phagura et al. | |
| 2005/0183283 A1 | 8/2005 | Evanyk et al. | |
| 2005/0201299 A1* | 9/2005 | Radi et al. | 370/254 |
| 2005/0220020 A1 | 10/2005 | Qureshi et al. | |
| 2006/0003810 A1* | 1/2006 | Saikyo et al. | 455/566 |
| 2006/0028979 A1 | 2/2006 | Levesque et al. | |
| 2006/0083217 A1* | 4/2006 | Bae | 370/351 |
| 2006/0101149 A1 | 5/2006 | Deininger et al. | |
| 2006/0168083 A1 | 7/2006 | Lee et al. | |
| 2006/0168105 A1 | 7/2006 | Glufke et al. | |
| 2006/0190551 A1 | 8/2006 | Kato et al. | |
| 2006/0200828 A1 | 9/2006 | Na | |
| 2007/0105531 A1* | 5/2007 | Schroeder et al. | 455/411 |
| 2007/0150620 A1* | 6/2007 | Hand et al. | 709/248 |
| 2008/0056223 A1* | 3/2008 | Manser | 370/342 |
| 2008/0056240 A1* | 3/2008 | Ellis et al. | 370/352 |

OTHER PUBLICATIONS

Element Management Systems (EMSs) 2. *The Role of EMSs in the Five-Layer TMN Hierarchy*; International Engineering Consortium; (IEC: Element Management Systems (EMSs)) pp. 1-2.

Element Management Systems (EMSs) 3. *The TMN FCAPS Model of OSS Tasks*; International Engineering Consortium; (IEC: Element Management Systems (EMSs)) pp. 1-2.

Element Management Systems (EMSs) 4. *A Four-Function EMS Model*; International Engineering Consortium; (IEC: Element Management Systems (EMSs)) pp. 1-3.

Element Management Systems (EMSs) 5. *Service Provisioning*; International Engineering Consortium; (IEC: Element Management Systems (EMSs)) pp. 1-5.

Element Management Systems (EMSs) 6. *Service Assurance*; International Engineering Consortium; (IEC: Element Management Systems (EMSs)) pp. 1-4.

Element Management Systems (EMSs); 7. *EMS and NE Operations Support*; International Engineering Consortium; (IEC: Element Management Systems (EMSs)) pp. 1-3.

Element Management Systems (EMSs); 8. *Automation Enabler*; International Engineering Consortium; (IEC: Element Management Systems (EMSs)) pp. 1-6.

Element Management Systems (EMSs); 9. *Network EMS Software Architecture*; International Engineering Consortium; (IEC: Element Management Systems (EMSs)) pp. 1-2.

Element Management Systems (EMSs); 10. *EMS-Related Standards and Standards Organizations*; International Engineering Consortium; (IEC: Element Management Systems (EMSs)) pp. 1-2.

Element Management Systems (EMSs); 11. *Considerations of Network-Element-Vendor-Provided Versus Independently Developed EMSs*; International Engineering Consortium; (IEC: Element Management Systems (EMSs)) pp. 1-3.

* cited by examiner

METHODS OF PROVIDING SIMULATION FOR COMMUNICATIONS SYSTEMS AND RELATED SYSTEMS AND COMPUTER PROGRAM PRODUCTS

FIELD OF THE INVENTION

The present invention generally relates to the field of communications, and more particularly to methods of operating communications systems and related systems and computer program products.

BACKGROUND

A telephone system is a type of communications network, and a telephone system may include Network Elements (NEs) such as central offices or groups thereof in which telephone computer systems control corresponding portions of a telephone switching network in accordance with subscriber requirements and subscriber line configurations.

Subscriber services information may include such items as class of service (e.g., business or residential), call waiting, call forwarding, caller ID, the billing plan desired, the long distance carrier desired, the maintenance plan desired, etc. Subscriber line configurations may include such items as the number and types of lines at the subscriber's home or business, which equipment at the subscriber's home or business is owned by the subscriber and which equipment is owned by the telephone company, the type and location of the equipment, information as to leased lines, etc. In a typical telephone system many parameters (for example, well over a hundred, and sometimes a few hundred parameters) may be needed to describe the services and line configurations for a single subscriber.

To provide a more responsive interface between one or more (in some cases as many as several hundred) central offices of a telephone network and telephone company customer service representatives or other telephone company personnel or systems, an Element Management System (EMS) may be used. Such an EMS may maintain subscriber data in a database which can more quickly and accurately respond to queries from telephone company personnel or automated systems without significantly degrading the switching performance of the telephone network.

SUMMARY

According to some embodiments of the present invention, a method of simulating a telecommunications network may include providing a database including status information for a plurality of virtual network elements. More particularly, the status information for each of the plurality of virtual network elements may include a respective network element identifier. In addition, a communication including a received network element identifier may be received. If the received network element identifier does not correspond to a network element identifier included in the database, status information for a new virtual network element may be added to the database, with the status information for the new virtual network element including the received network element identifier. After adding the status information for the new virtual network element, a communication regarding the new virtual network element may be transmitted.

If the received network element identifier corresponds to a network element identifier included in the database, a communication regarding the virtual network element may be transmitted. Adding status information for the new virtual network element to the database may include adding the status information for the new virtual network element to the database without receiving information from an actual network element.

The status information for the new virtual network element may include at least one of a port identification, a switch card identification, a shelf identification, a rack identification, a switch card type, a switch card software version, a subscriber identification associated with a port, an in/out service indication, error information, a network element name, and/or a network element type. Moreover, the received network element identifier may include a network element name and a network element type. More particularly, receiving the communication may include receiving the communication from a network management system, transmitting the communication may include transmitting the communication to the network management system, and the network management system may include a network management system according to the Telecommunications Management Network (TMN) architecture. Providing the database, for example, may include copying status information for real network elements from a database of an element management system associated with real network elements.

The database may include status information for the plurality of virtual network elements and for a plurality of actual network elements, receiving the communication may include receiving the communication at an element management system from a network management system, and transmitting the communication may include transmitting the communication to the network management system. In addition, an actual network element may be discovered for which status information is not included in the database, and in response to discovering the actual network element, status information for the actual network element may be added to the database.

In addition, a provisioning communication may be received, and the provisioning communication may include a network element identifier for one of the plurality of virtual network elements for which status information is included in the database. Responsive to receiving the provisioning communication, the status information in the database for the virtual network element corresponding to the network element identifier received in the provisioning communication may be revised. Moreover, revising the status information for the virtual network element may include revising the status information for the virtual network element without altering an actual network element corresponding to the network element identifier received in the provisioning communication.

According to other embodiments of the present invention, a method of simulating a telecommunications network may include providing a database including status information for a plurality of virtual network elements, and the status information for each of the plurality of virtual network elements may include a respective network element identifier. A provisioning communication may be received, and the provisioning communication may include a network element identifier for one of the plurality of virtual network elements for which status information is included in the database. Responsive to receiving the provisioning communication, the status information in the database for the virtual network element corresponding to the network element identifier received in the provisioning communication may be revised.

Revising the status information for the virtual network element may include revising the status information for the virtual network element without altering an actual network element corresponding to the network element identifier received in the provisioning communication. Moreover, the status information for the virtual network element corresponding to the network element identifier received in the provisioning communication may include at least one of a port identification, a switch card identification, a shelf identification, a rack identification, a switch card type, a switch card software version, a subscriber identification associated with a port, an in/out service indication, error information, a network element name, and/or a network element type. The received network element identifier may include a network element name and a network element type.

Receiving the provisioning communication may include receiving the provisioning communication from a network management system according to the Telecommunications Management Network (TMN) architecture. Providing the database may include copying status information for real network elements from a database of an element management system associated with real network elements.

The database may include status information for the plurality of virtual network elements and for a plurality of actual network elements, and receiving the communication may include receiving the provisioning communication at an element management system from a network management system. In addition, an actual network element may be discovered for which status information has changed relative to that included in the database for the actual network element. In response to discovering, the status information for the actual network element in the database may be revised.

In addition, a communication including a received network element identifier may be received. If the received network element identifier does not correspond to a network element identifier included in the database, status information for a new virtual network element may be added to the database with the status information for the new virtual network element including the received network element identifier. After adding the status information for the new virtual network element, a communication regarding the new virtual network element may be transmitted. Adding status information for the new virtual network element to the database may include adding the status information for the new virtual network element to the database without receiving elements of the status information from an actual network element. If the received network element identifier corresponds to a network element identifier included in the database, a communication regarding the virtual network element may be transmitted.

According to still other embodiments of the present invention, a system for simulating a telecommunications network may include a database and an element management system. The database may include status information for a plurality of virtual network elements, and the status information for each of the plurality of virtual network elements may include a respective network element identifier. The element management system may be configured to receive a communication including a received network element identifier from a network management system, and configured to add status information for a new virtual network element to the database if the received network element identifier does not correspond to a network element identifier included in the database. More particularly, the status information for the new virtual network element may include the received network element identifier. The element management system may be further configured to transmit a communication regarding the new virtual network element after adding the status information for the new virtual network element.

According to yet other embodiments of the present invention, a system for simulating a telecommunications network may include a database and an element management system. The database may include status information for a plurality of virtual network elements, and the status information for each of the plurality of virtual network elements may include a respective network element identifier. The element management system may be configured to receive a provisioning communication including a network element identifier for one of the plurality of virtual network elements for which status information is included in the database. The element management system may be further configured to revise the status information in the database for the virtual network element corresponding to the network element identifier received in the provisioning communication responsive to receiving the provisioning communication.

According to more embodiments of the present invention, a computer program product for simulating a telecommunications network may include a computer readable medium having computer readable program code embodied therein. The computer readable program code may include computer readable program code configured to provide a database including status information for a plurality of virtual network elements, and the status information for each of the plurality of virtual network elements may include a respective network element identifier. Computer readable program code may also be configured to receive a communication including a received network element identifier from a network management system. In addition, computer readable program code may be configured to add status information for a new virtual network element to the database if the received network element identifier does not correspond to a network element identifier included in the database, and the status information for the new virtual network element may include the received network element identifier. Moreover, computer readable program code may be configured to transmit a communication regarding the new virtual network element after adding the status information for the new virtual network element.

According to still more embodiments of the present invention, a computer program product for simulating a telecommunications network may include a computer readable medium having computer readable program code embodied therein. The computer readable program code may include computer readable program code configured to provide a database including status information for a plurality of virtual network elements, and the status information for each of the plurality of virtual network elements may include a respective network element identifier. Computer readable program code may also be configured to receive a provisioning communication including a network element identifier for one of the plurality of virtual network elements for which status information is included in the database. In addition, computer readable program code may be configured to revise the status information in the database for the virtual network element corresponding to the network element identifier received in the provisioning communication responsive to receiving the provisioning communication.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The present invention now will be described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

It will be understood that, when an element is referred to as being "coupled" to another element, it can be directly coupled to the other element or intervening elements may be present. In contrast, when an element is referred to as being "directly coupled" to another element, there are no intervening elements present. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, apparatus, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, or semiconductor system, apparatus, device, or other tangible medium. More specific examples (a non-exhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to block diagrams and/or operational illustrations of methods, apparatus, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
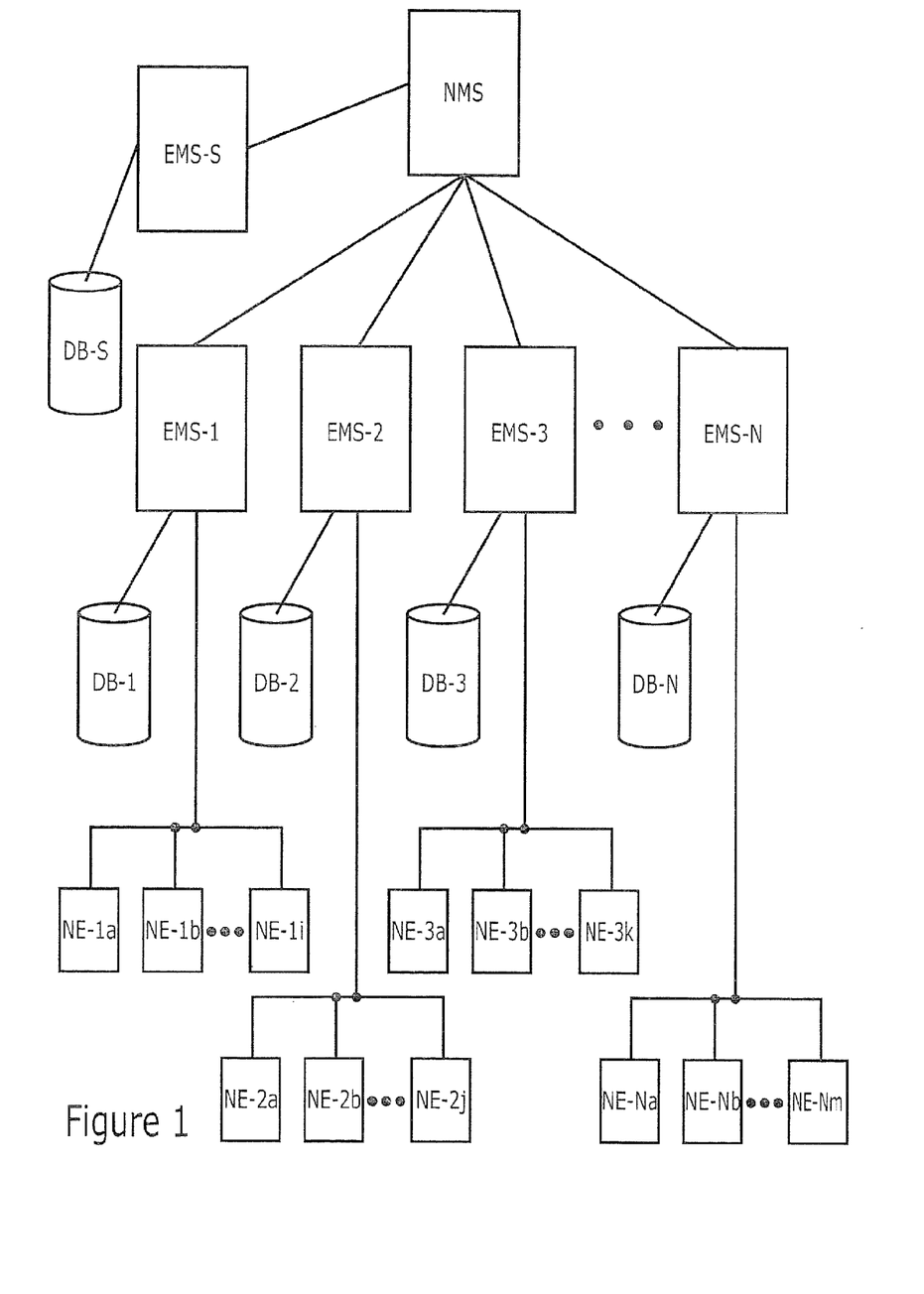
FIG. 1 is a block diagram illustrating telecommunications networks according to embodiments of the present invention.

FIG. 1 is a block diagram illustrating telecommunications networks according to embodiments of the present invention. As shown in FIG. 1, a network management system NMS communicates with a plurality of element management systems EMS-1 to EMS-N, and each element management system communicates with a respective plurality of network elements NE-1a to NE-1i, NE-2a to NE-2j, NE-3a to NE-3k, and NE-Na to NE-Nm (also referred to as telecommunications network elements). Moreover, databases DB-1 to DB-N may be associated with respective ones of the element management systems EMS-1 to EMS-N. While the databases are shown as being separate from the respective element management systems, the databases and element management systems may be integrated. Network Management Systems (NMSs), Element Management Systems (EMSs), and Network Elements (NEs) and operations thereof are discussed, for example, in the tutorial by the International Engineering Consortium entitled "Element Management Systems (EMSs)," chapters 1-11, www.iec.org/online/tutorials/ems/, the disclosure of which is hereby incorporated herein in its entirety by reference. Element Management Systems (EMSs), Network Elements (NEs), and Network Management Systems (NMSs) are further discussed, for example, in U.S. Patent Publication Nos. 2003/0172141, 2003/0108177, 2003/0202645, 2003/0101251, 2003/0131054, 2003/0133556, and 2005/0220020, the disclosures of which are hereby incorporated herein in their entirety by reference.

As further shown in FIG. 1, an element management system EMS-S (also referred to as a simulated element management system) and associated database DB-S may be used to simulate the presence of one or more additional network elements (also referred to as simulated or virtual network elements). The element management system EMS-S may thus provide an integrated element management system and network element simulator. Accordingly, a single a single application at the EMS-S may simulate capabilities of an element management system and simulated network elements managed thereby.

While FIG. 1 does not show the presence of any actual (or real) network elements in communication with the element management system EMS-S, the element management system EMS-S may both simulate virtual network elements and communicate with actual network elements according to some embodiments of the present invention. Moreover, one or more of the element management systems EMS-1 to EMS-N may simulate virtual network elements in addition to communicating with actual network elements NE-1a to NE-1i, NE-2a to NE-2j, NE-3a to NE-3k, and NE-Na to NE-Nm. Stated in other words, a same element management system may both provide communication with actual network elements as discussed with regard to element management systems EMS-1 to EMS-N and simulate virtual network elements as discussed with regarding to element management system EMS-S.

A single network element NE (also referred to as a telecommunications network element) may include a number of independently programmable switching cards arranged in shelves and racks of the network element NE, and each switching card may provide one or a plurality of communications ports coupled to customer/subscriber equipment. Communications between each network element NE and its respective element management system EMS may be provided, for example, using a protocol(s) such as TL1, premise distribution system (PDS) Snyder, simple network management protocol (SNMP), common management information service element (CMISE), common management information protocol (CMIP), and/or a proprietary interface.

Each element management system EMS may be used by the network management system NMS to monitor the network elements and to change signal switching and routing as required. Each element management system EMS and the associated database DB may also maintain information as to subscriber services and subscriber line configurations provided by the network elements NEs coupled thereto. An element management system EMS may thus respond to queries from the network management system NMS regarding status of the network elements NEs without significant burden on operations of the network elements NEs.

Each element management system EMS may be deployed for a group of network elements NEs of the same type or system of network elements, such as digital cross-connect systems (DCSs), digital subscriber line access multiplexers (DSLAMs), a ring of synchronous optical network (SONET) add-drop multiplexers (ADMs), and/or a hybrid fiber/coax (HFC) cable-telephony system. Each element management system EMS may thus control and manage aspects of network elements NEs in its domain to improve resource allocation and/or usage. Each element management system EMS may also abstract relevant aspects of information regarding the network elements NEs in its domain in an information model to be communicated to the network management system NMS. An element management system EMS, for example, may provide service provisioning, network development and planning, network management, network provisioning, service assurance, network maintenance and restoration, and network monitoring and control.

The network management system NMS (also referred to as a client or user) may communicate with a plurality of element management systems EMSs. Moreover, a client/server relationship may exist between the network management system NMS and the element management systems EMS in communication therewith, with the network management system NMS acting as a client and the element management systems EMSs acting as servers.

Communications between the network management system NMS and the element management systems EMS-1 to EMS-N and EMS-S may be provided over a communications network (such as the Internet) using a communication protocol such as TCP/IP. In addition, communications between the element management systems EMS-1 to EMS-N and the respective network elements NE-1a to NE-1i, NE-2a to NE-2j, NE-3a to NE-3k, and NE-Na to NE-Nm may be provided over the same or a different communications network (such as the Internet). Moreover, communications between the network management system NMS and the element management systems EMS-1 to EMS-N and EMS-S may be provided according to a protocol such as the Common Object Request Broker Architecture (CORBA).

Operations of network elements NEs, element management systems EMSs, and the network management system NMS may be defined, for example, according to the Telecommunications Management Network (TMN) architecture, as discussed, for example, in "Element Management Systems (EMS)s: 2. The Role of EMSs in the Five-Layer TMN Hierarchy," International Engineering Consortium (IEC), www.iec.org/online/tutorials/ems, the disclosure of which is hereby incorporated herein in its entirety by reference. More particularly, a network element layer (including the network elements NEs) may provide switches, transmission, and/or distribution systems; an element management layer (including the element management systems EMSs) may provide management of the network elements NEs; and a network management layer (including the network management system NMS) may manage the element management systems EMSs.

Figure 2:
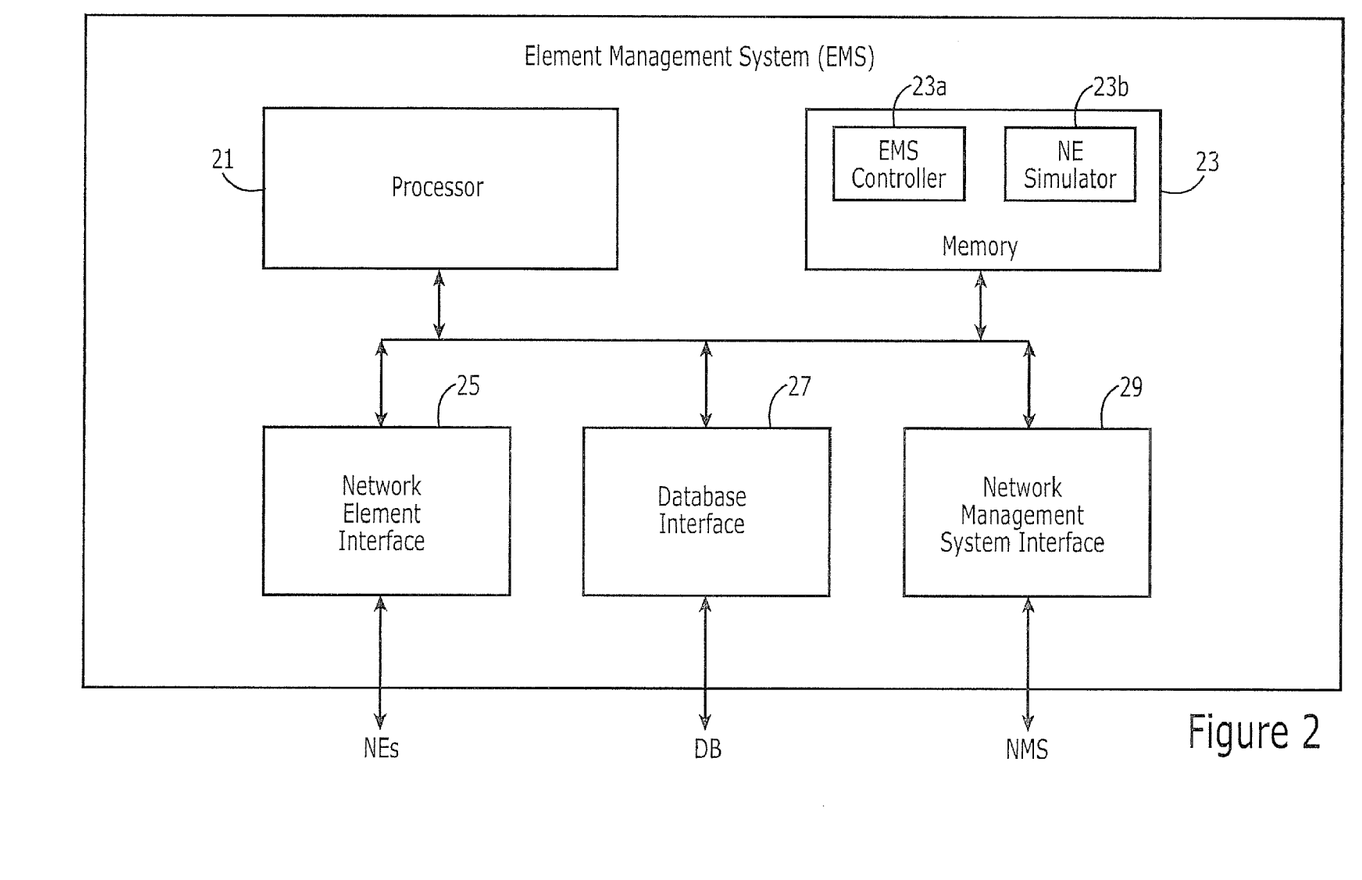
FIG. 2 is a block diagram of element management systems according to embodiments of the present invention.

Each of the element management systems EMS-1 to EMS-N and/or EMS-S of FIG. 1 may be implemented according to the block diagram illustrated in FIG. 2. As shown in FIG. 2, an element management system EMS may include a processor 21, a memory 23, a network-element interface 25, a database interface 27, and a network management system interface 29. Moreover, the memory may include EMS controller 23a used by the processor 21 to provide EMS functionality, and NE simulator 23b used by the processor 21 to provide network element simulation. More particularly, the network management system interface 29 may provide communications with the network management system NMS, and the network element interface 25 may provide communications with respective network elements such as NE-1a to NE-1i, NE-2a to NE-2j, NE-3a to NE-3k, or NE-Na to NE-Nm. In addition, the database interface 27 may provide communications with the respective database DB. Structures of element management systems are discussed, for example, in U.S. Patent Publication Nos. 2003/0172141, 2003/0108177, and 2005/0220020, the disclosures of which are hereby incorporated herein in their entirety by reference.

If the element management system of FIG. 2 is used to communicate with actual network elements and does not simulate virtual network elements (as shown, for example, with respect to EMS-1 to EMS-N of FIG. 1), the NE simulator 23b may be omitted from memory 23. If the element management system of FIG. 2 and its respective database are integrated, the database interface 27 may be omitted, and the database may be implemented in memory 23. If the element management system of FIG. 2 is used to simulate virtual network elements and does not communicate with actual network elements (as shown, for example, with respect to EMS-S of FIG. 1), the network element interface 25 may be omitted. Each of the element management systems EMS-1 to EMS-N may thus provide service provisioning and/or service assurance functionality(ies) with respect to the network elements NE-1a to NE-1i, NE-2a to NE-2j, NE-3a to NE-3k, and NE-Na to NE-Nm associated therewith.

An element management system (such as EMS-1, EMS-2, EMS-3, or EMS-N) may provide service provisioning functionality such as inventory management support and/or configuration management support. Inventory management support may include maintaining a record in the respective database of all resources of the respective network elements (such as NE-1a to NE-1i, NE-2a to NE-2j, NE-3a to NE-3k, and NE-Na to NE-Nm). The record for each network element may include locations, quantities of equipment, model numbers, serial numbers, versions, installation dates, etc. Configuration management support may include control of network resources, topologies, and/or redundancies at network elements; installation and/or turn-on of new equipment resources at network elements; assignment of network element resources to trunk routes or service areas, control of equipment, and network protection switching; and/or partitioning of the physical network provided by the respective network elements into virtual private networks.

When installing a new network element NE associated with an element management system EMS, the element management system EMS may load tables and parameters to install the new network element, and the element management system EMS may autodiscover components of the network element NE and populate the respective database DB with information relating to the components of the network element NE. When equipment is added to a network element NE associated with an element management system EMS, the element management system EMS may autodiscover the new equipment and populate the database DB with information relating to the added equipment. Similarly, when an existing component of a network element NE is revised (for example, when a software patch or upgrade is downloaded to a component of a network element), the element management system EMS may update portions of the database relating to the revised component.

The element management system EMS may also provide a backup for network element databases, and the element management system EMS may restore a database at one or more network elements if the database is corrupted or lost at a network element(s). If a connection between the element management system EMS and a respective network element is lost, the element management system EMS may resynchronize its database DB with the current state of the network element once the lost connection is regained. Moreover, the element management system EMS may periodically resynchronize its database DB with the network elements coupled thereto using an autodiscovery process.

With regard to service assurance, an element management system EMS may monitor the associated network elements to detect malfunction(s), preempt failure(s), and/or detect faults to provide fault management support. An element management system EMS may also periodically collect quality metrics used to characterize performance of network elements associated with the element management system over service intervals. In addition, an element management system EMS may collect data regarding levels of utilization of network element resources assigned to subscribers.

Each element management system supporting operations of actual network elements (such as EMS-1, EMS-2, EMS-3, or EMS-N) may thus store information relating to the associated network elements in a respective database (such as DB-1, DB-2, DB-3, or DB-N). Moreover, each element management system may provide information regarding the associated network elements to the network management system NSM responsive to queries from the network management system.

According to embodiments of the present invention, the element management system EMS-S of FIG. 1 may simulate virtual network elements so that operations of the network management system with different network element configurations can be tested without building out actual network element configurations. Operations of simulating telecommunications networks using virtual network elements are discussed below with respect to the flow charts of FIGS. 3 and 4.

Figure 3:
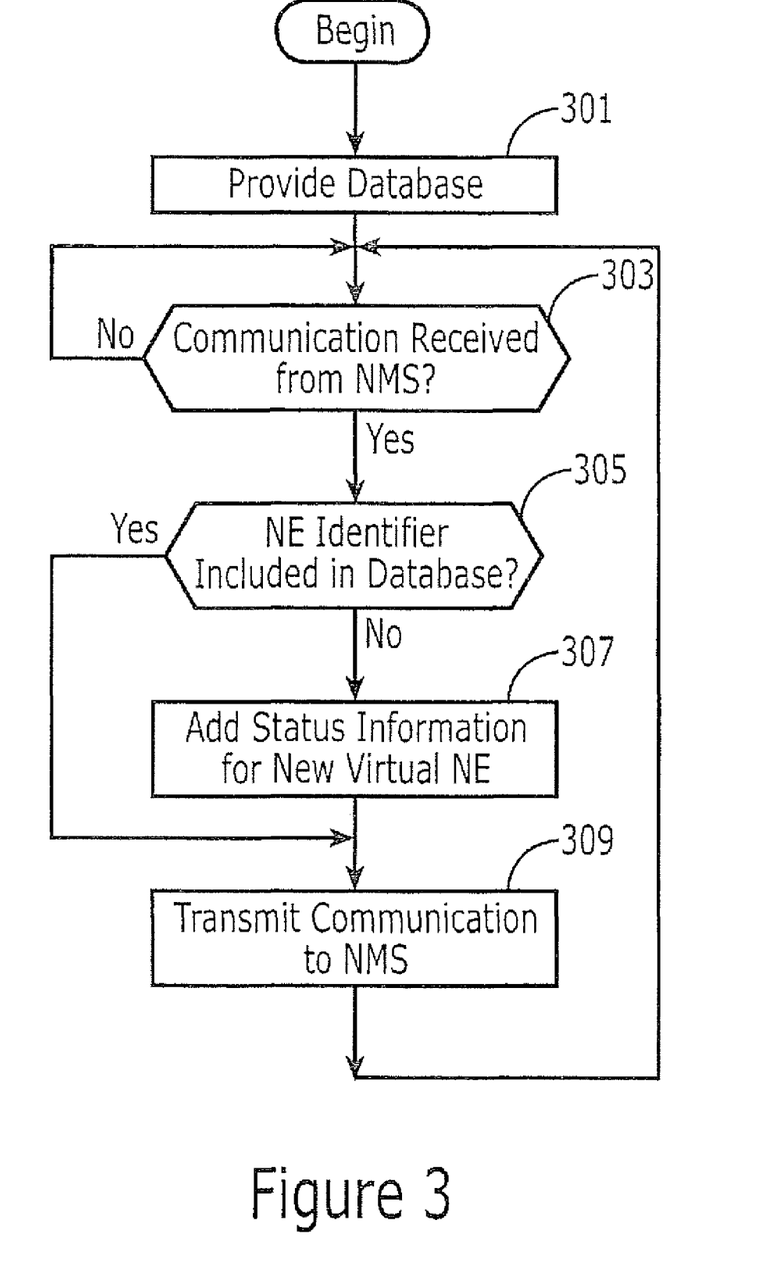
FIGS. 3 and 4 are flow charts illustrating operations of simulating telecommunications networks according to embodiments of the present invention.

As shown in FIG. 3, a simulated element management system EMS-S may provide a database DB-S at block 301, and the database DB-S may include status information for a plurality of virtual network elements. By way of example, providing the database DB-S may include providing the database by copying status information for actual network elements (such as one or more of network elements NE-1a to NE-1i, NE-2a to NE-2j, NE-3a to NE-3k, and NE-Na to NE-Nm) from a database (such as one or more of databases DB-1 to DB-N) of an element management system (such as one or more of element management systems EMS-1 to EMS-N) associated with real network elements.

More particularly, the status information for each of the plurality of virtual network elements may include a respective network element identifier. The simulated element management system EMS-S may receive a communication including a received network element identifier from a network management system NMS at block 303. The received network element identifier, for example, may include a network element name and a network element type, and the network management system NMS may be a network management system according to the Telecommunications Management Network (TMN) architecture.

If the received network element identifier does not correspond to a network element identifier included in the database DB-S at block 305, the simulated element management system EMS-S may add status information for a new virtual network element to the database DB-S at block 307, and the status information for the new virtual network element may include the received network element identifier. After adding the status information for the new virtual network element to the database DB-S at block 307, a communication regarding the new virtual network element may be transmitted from the simulated element management system EMS-S to the network management system NMS at block 309. If the received network element identifier corresponds to a network element identifier included in the database at block 305, the simulated element management system EMS-S may transmit a communication regarding the virtual network element to the network management system NMS at block 309 without changing the database DB-S. According to the operations of FIG. 3, virtual network elements may be created in the database DB-S by the simulated element management system EMS-S "on-the-fly" without requiring a discovery process.

Adding status information for the new virtual network element to the database DB-S at block 307 may include adding the status information for the new virtual network element to the database DB-S without receiving elements of the status information from an actual network element (such as actual network elements NE-1a to NE-1i, NE-2a to NE-2j, NE-3a to NE-3k, and NE-Na to NE-Nm). Moreover, the status information for the new virtual network element may include at least one of a port identification, a switch card identification, a shelf identification, a rack identification, a switch card type, a switch card software version, a subscriber identification associated with a port, an in/out service indication, error information, a network element name, and/or a network element type.

The simulated element management system EMS-S may also receive a provisioning communication including a network element identifier for one of the plurality of virtual network elements for which status information is included in the database. Responsive to receiving the provisioning communication, the simulated element management system EMS-S may revise the status information in the database DB-S for the virtual network element corresponding to the network element identifier received in the provisioning communication. Moreover, revising the status information for the virtual network element may include revising the status information for the virtual network element without altering an actual network element corresponding to the network element identifier received in the provisioning communication.

Embodiments of the present invention illustrated in FIG. 3 may thus be implemented using a simulated element management system EMS-S that is not used to manage actual network elements. According to other embodiments of the present invention, status information for virtual network elements may be stored in a database (such as one or more of databases DB-1 to DB-N) associated with an element management system (such as one or more of element management systems EMS-1 to EMS-N) used to manage actual network elements (such as one or more of actual network elements NE-1a to NE-1i, NE-2a to NE-2j, NE-3a to NE-3k, and NE-Na to NE-Nm). Accordingly, an element management system (such as element management system EMS-1) may both manage actual network elements (such as network elements NE-1a to NE-1i) according to the TMN architecture and also simulate virtual network elements as discussed above with respect to FIG. 3.

Accordingly, the database (such as database DB-1) provided at block 301 may include status information for the plurality of virtual network elements and for a plurality of actual network element (such as network elements NE-1a to NE-1i). Receiving the communication at block 303 may include receiving the communication at an element management system (such as element-management system EMS-1) from a network management system (such as network management system NMS). Moreover, transmitting the communication at block 309 may include transmitting the communication to the network management system. In addition, the element management system may also discover an actual network element for which status information is not included in the database, and in response to discovering the actual network element, status information for the actual network element may be added to the database. The actual network element may be discovered, for example, using an autodiscovery process of the TMN architecture.

Figure 4:
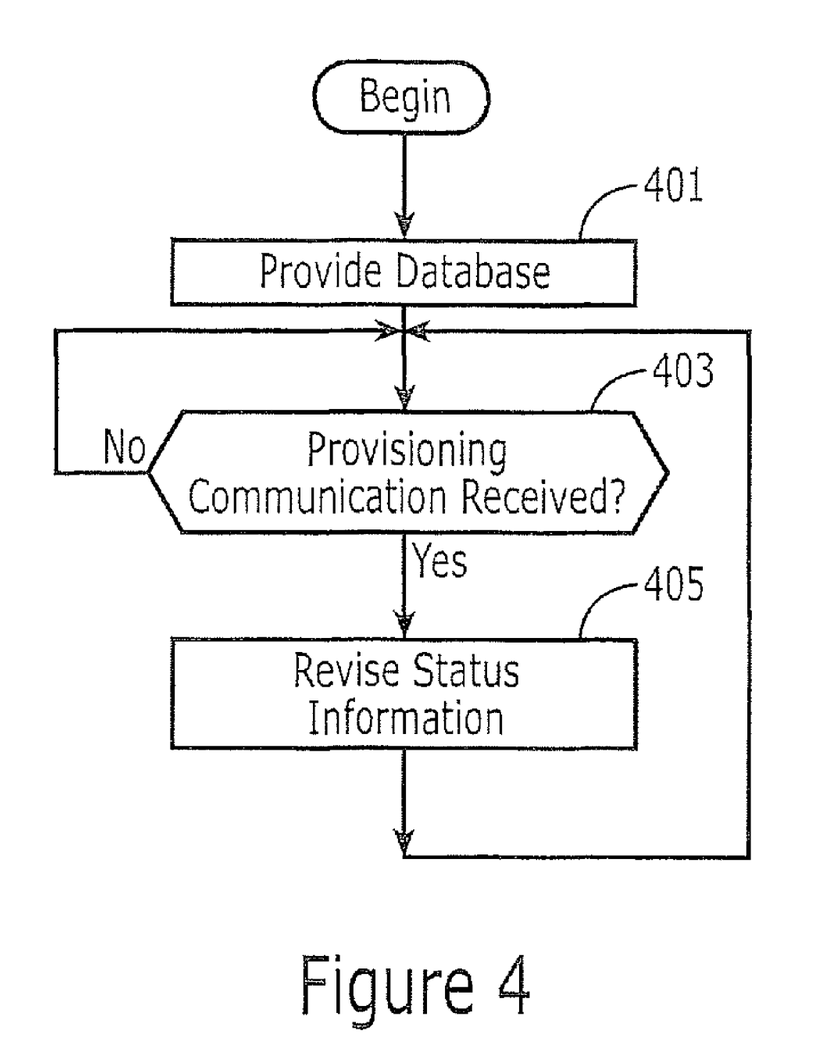

As shown in FIG. 4, a simulated element management system EMS-S may provide a database DB-S including status information for a plurality of virtual network elements at block 401, and the status information for each of the plurality of virtual network elements may include a respective network element identifier. The database may be provided, for example, as discussed above with respect to FIG. 3, with new virtual network elements being added to the database responsive to communications from the network management system NMS. Moreover, providing the database DB-S may include copying status information for real network elements from a database of an element management system associated with real network elements.

The simulated element management system EMS-S may receive a provisioning communication from the network management system NMS at block 403, and the provisioning communication may include a network element identifier for one of the plurality of virtual network elements for which status information is included in the database DB-S. More particularly, receiving the provisioning communication at block 403 may include receiving the provisioning communication from a network management system NMS according to the Telecommunications Management Network (TMN) architecture.

Responsive to receiving the provisioning communication at block 403, the simulated element management system EMS-S may revise the status information in the database for the virtual network element corresponding to the network element identifier received in the provisioning communication. Revising the status information for the virtual network element at block 405 may include revising the status information for the virtual network element without altering an actual network element corresponding to the network element identifier received in the provisioning communication.

The status information for the virtual network element corresponding to the network element identifier received in the provisioning communication at block 403 may include at least one of a port identification, a switch card identification, a shelf identification, a rack identification, a switch card type, a switch card software version, a subscriber identification associated with a port, an in/out service indication, error information, a network element name, and/or a network element type. Moreover, the received network element identifier may include a network element name and a network element type.

Embodiments of the present invention illustrated in FIG. 4 may thus be implemented using a simulated element management system EMS-S that is not used to manage actual network elements. According to other embodiments of the present invention, status information for virtual network elements may be stored in a database (such as one or more of databases DB-1 to DB-N) associated with an element management system (such as one or more of element management systems EMS-1 to EMS-N) used to manage actual network elements (such as one or more of actual network elements NE-1a to NE-1i, NE-2a to NE-2j, NE-3a to NE-3k, and NE-Na to NE-Nm). Accordingly, an element management system (such as element management system EMS-1) may both manage actual network elements (such as network elements NE-1a to NE-1i) according to the TMN architecture and also simulate virtual network elements as discussed above with respect to FIG. 4.

Accordingly, the database (such as database DB-1) provided at block 301 may include status information for the plurality of virtual network elements and for a plurality of actual network element (such as network elements NE-1a to NE-1i). Receiving the provisioning communication at block 403 may include receiving the provisioning communication at an element management system (such as element management system EMS-1) from a network management system (such as network management system NMS). In addition, the element management system may also discover an actual network element for which status information has changed relative to that included in the database DB-S for the actual network element, and in response to discovering, the element management system EMS-1 may revise the status information for the actual network element in the database. The discovery may be made, for example, using an autodiscovery process of the TMN architecture.

Moreover, the simulated element management system EMS-S may synchronize information regarding virtual network elements from the database DB-S with a database at the network management system NMS. Moreover, an interface between the network management system NMS and the simulated element management system EMS-S may be the same as an interface between the network management system NMS and the element management systems EMS-1 to EMS-2 so that the network management system NMS cannot distinguish between virtual network elements and actual (or real) network elements (such as network elements NE-1a to NE-1i, NE-2a to NE-2j, NE-3a to NE-3k, and NE-Na to NE-Nm).

The simulated element management system EMS-S and the network management system NMS may communicate over a data network (such as the Internet) using a communications protocol such as TCP/IP. Moreover, while the simulated element management system EMS-S and the network management system NMS may be implemented using physically separated computing devices, the simulated element management system EMS-S and the network management system NMS may be implemented at a same location, for example, using a same computing device according to other embodiments of the present invention.

Simulated element management systems, methods, and computer program products according to embodiments of the present invention may thus allow rapid and inexpensive production of a functional model of a broadband communications network in a lab environment. In addition, events from the field may be reproduced in the lab environment using the functional model to identify network problems. Moreover, simulated element management systems according to embodiments of the present invention may perform any operation supported by a graphical user interface of a conventional network management system.

Simulated element management systems according to embodiments of the present invention may simulate functionality of an actual element management system and network elements managed thereby. Moreover, such simulated element management systems may be scaleable so that there is no limit to a number of element management systems and/or network elements that may be simulated. In other words, the simulated element management system may be scaleable so that increasing numbers of element management systems and/or network elements may be simulated without significantly increasing cost. For example, element management systems and network elements of an entire telecommunications network may be simulated. Moreover, simulated element management systems according to embodiments of the present invention may be customizable so that responses to abnormal scenarios may be tested. In addition, simulated element management systems according to embodiments of the present invention may be relatively inexpensive to maintain and may be relatively easy to integrate into a lab environment.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method of simulating a telecommunications network, the method comprising:
providing a database in an element management system wherein the database includes status information for a plurality of virtual network elements, wherein the status information for each of the plurality of virtual network elements includes a respective network element identifier;
receiving a communication including a network element identifier at the element management system from a network management system;
determining at the element management system whether the network element identifier received from the network management system corresponds to a network element identifier included in the database;
if the network element identifier received from the network management system does not correspond to a network element identifier included in the database, adding status information for a new virtual network element to the database responsive to determining whether the network element identifier received from the network management system corresponds to a network element identifier included in the database wherein the status information for the new virtual network element includes the network element identifier received from the network management system, wherein adding status information for the new virtual network element to the database comprises adding the status information for the new virtual network element to the database without receiving information from an actual network element so that status information for the new virtual network element is created on the fly at the element management system without a discovery process; and
after adding the status information for the new virtual network element, transmitting a communication regarding the new virtual network element from the element management system to the network management system.

2. A method according to claim 1 wherein the status information for the new virtual network element includes at least one of a port identification, a switch card identification, a shelf identification, a rack identification, a switch card type, a switch card software version, a subscriber identification associated with a port, an in/out service indication, error information, a network element name, and/or a network element type.

3. A method according to claim 1 further comprising:
if the network element identifier received from the network management system corresponds to a network element identifier included in the database, transmitting a communication regarding a virtual network element corresponding to the received network element identifier from the element management system to the network management system without adding status information for the virtual network element responsive to determining whether the network element identifier received from the network management system corresponds to a network element identifier included in the database.

4. A method according to claim 1 wherein the received network element identifier includes a network element name and a network element type.

5. A method according to claim 1 wherein the network management system comprises a network management system according to a Telecommunications Management Network (TMN) architecture.

6. A method according to claim 1 wherein providing the database comprises copying status information for actual network elements from a database of an element management system associated with actual network elements so that the database includes status information for virtual and actual network elements, wherein receiving the communication from the network management system comprises receiving the communication after providing the database, and wherein the new virtual network element is not associated with any of the actual network elements.

7. A method according to claim 1 wherein the database includes status information for the plurality of virtual network elements and for a plurality of actual network elements, the method further comprising:
discovering an actual network element for which status information is not included in the database; and
in response to discovering the actual network element, adding status information for the actual network element to the database so that the database includes status information for virtual and actual network elements.

8. A method according to claim 1 further comprising:
receiving a provisioning communication at the element management system from the network management system wherein the provisioning communication includes a network element identifier for one of the plurality of virtual network elements for which status information is included in the database; and responsive to receiving the provisioning communication, revising the status information in the database for the virtual network element corresponding to the network element identifier received in the provisioning communication without altering an actual network element corresponding to the network element identifier.

9. A method of simulating a telecommunications network, the method comprising:
provided a database in an element management system wherein the database includes status information for a plurality of virtual network elements, wherein the status information for each of the plurality of virtual network elements includes a respective network element identifier;
receiving a provisioning communication at the element management system from the network management system wherein the provisioning communication includes a network element identifier for one of the plurality of virtual network elements for which status information is included in the database; and
responsive to receiving the provisioning communication at the element management system from the network management system, revising the status information in the database for the virtual network element corresponding to the network element identifier received in the provisioning communication from the network management system, wherein revising the status information for the virtual network element comprises revising the status information for the virtual network element without altering status information for an actual network element corresponding to the network element identifier received in the provisioning communication.

10. A method according to claim 9 wherein the status information for the virtual network element corresponding to the network element identifier received in the provisioning communication from the network management system includes at least one of a port identification, a switch card identification, a shelf identification, a rack identification, a switch card type, a switch card software version, a subscriber identification associated with a port, an in/out service indication, error information, a network element name, and/or a network element type.

11. A method according to claim 9 wherein the received network element identifier includes a network element name and a network element type.

12. A method according to claim 9 wherein the network management system comprises a network management system according to a Telecommunications Management Network (TMN) architecture.

13. A method according to claim 9 wherein providing the database comprises copying status information for real network elements from a database of an element management system associated with real network elements so that the database includes status information for both virtual and real network elements.

14. A method according to claim 9 wherein the database includes status information for the plurality of virtual network elements and for a plurality of actual network elements so that the database includes status information for both virtual and actual network elements, the method further comprising:
discovering an actual network element for which status information has changed relative to that included in the database for the actual network element; and
in response to discovering, revising the status information for the actual network element in the database.

15. A method according to claim 9 further comprising:
receiving a communication at the element management system from the network management system wherein the communication includes a network element identifier;
determining whether the network element identifier received from the network management system corresponds to a network element identifier included in the database;
if the network element identifier received from the network management system does not correspond to a network element identifier included in the database, adding status information for a new virtual network element to the database responsive to determining whether the network element identifier received from the network management system corresponds to a network element identifier included in the database wherein the status information for the new virtual network element includes the received network element identifier; and
after adding the status information for the new virtual network element, transmitting a communication regarding the new virtual network element from the element management system to the network management system.

16. A system for simulating a telecommunications network, the system comprising:
a database in an element management system wherein the database includes status information for a plurality of virtual network elements, wherein the status information for each of the plurality of virtual network elements includes a respective network element identifier; and
an element management system configured to receive a communication including a received network element identifier from a network management system, configured to determine whether the network element identifier received from the network management system corresponds to a network element identifier included in the database, configured to add status information for a new virtual network element to the database responsive to determining whether the network element identifier received from the network management system corresponds to a network element identifier included in the database if the network element identifier received from the network management system does not correspond to a network element identifier included in the database wherein the status information for the new virtual network element includes the network element identifier received from the network management system, and configured to transmit a communication regarding the new virtual network element from the element management system to the network management system after adding the status information for the new virtual network element, wherein adding status information for the new virtual network element to the database comprises adding the status information or the new virtual network element to the database without receiving information from an actual network element so that status information from the new virtual network element is created on the fly at the element management system without a discovery process.

* * * * *